(12) United States Patent
Takada et al.

(10) Patent No.: US 11,942,645 B2
(45) Date of Patent: Mar. 26, 2024

(54) NON-AQUEOUS ELECTROLYTE SECONDARY BATTERY HAVING SEPARATOR WITH MULTILAYER STRUCTURE

(71) Applicant: Panasonic Intellectual Property Management Co., Ltd., Osaka (JP)

(72) Inventors: Akihiko Takada, Hyogo (JP); Masanori Sugimori, Hyogo (JP); Nobuhiro Hirano, Osaka (JP); Yuki Morikawa, Hyogo (JP); Yasunori Baba, Hyogo (JP); Katsunori Yanagida, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 102 days.

(21) Appl. No.: 16/640,226

(22) PCT Filed: Nov. 2, 2018

(86) PCT No.: PCT/JP2018/040794
§ 371 (c)(1),
(2) Date: Feb. 19, 2020

(87) PCT Pub. No.: WO2019/107068
PCT Pub. Date: Jun. 6, 2019

(65) Prior Publication Data
US 2020/0251744 A1    Aug. 6, 2020

(30) Foreign Application Priority Data

Nov. 30, 2017   (JP) ................................. 2017-230504

(51) Int. Cl.
*H01M 4/66* (2006.01)
*H01M 2/16* (2006.01)
(Continued)

(52) U.S. Cl.
CPC .......... *H01M 4/668* (2013.01); *H01M 4/366* (2013.01); *H01M 4/58* (2013.01); *H01M 4/624* (2013.01);
(Continued)

(58) Field of Classification Search
None
See application file for complete search history.

(56) References Cited

U.S. PATENT DOCUMENTS

| 2014/0287295 A1 | 9/2014 | Honda et al. |
| 2014/0356695 A1 | 12/2014 | Abe et al. |

(Continued)

FOREIGN PATENT DOCUMENTS

| CN | 103918104 A | 7/2014 |
| JP | 2013-105521 A | 5/2013 |

(Continued)

OTHER PUBLICATIONS

Extended (Supplementary) European Search Report dated Dec. 3, 2020, issued in counterpart EP Application No. 18883270.3. (7 pages).

(Continued)

*Primary Examiner* — Zhongqing Wei
(74) *Attorney, Agent, or Firm* — WHDA, LLP

(57) ABSTRACT

A non-aqueous electrolyte secondary battery includes a positive electrode, a negative electrode, and a separator disposed between the positive electrode and the negative electrode. The separator has a multilayer structure in which a first filler layer containing phosphate particles, a porous resin substrate, and a second filler layer containing inorganic particles having higher heat resistance than the phosphate particles are stacked in this order from the negative electrode side. The first filler layer is disposed on the porous resin substrate in such a manner that the surface of the first filler (Continued)

layer faces the surface of the negative electrode. The phosphate particles have a BET specific surface area in the range of 5 m²/g or more and 100 m²/g or less.

7 Claims, 2 Drawing Sheets

(51) Int. Cl.
    *H01M 4/36*     (2006.01)
    *H01M 4/58*     (2010.01)
    *H01M 4/62*     (2006.01)
    *H01M 10/0525*     (2010.01)
    *H01M 50/417*     (2021.01)
    *H01M 50/423*     (2021.01)
    *H01M 50/431*     (2021.01)
    *H01M 50/434*     (2021.01)
    *H01M 50/451*     (2021.01)
    *H01M 50/457*     (2021.01)
    *H01M 50/46*     (2021.01)
    *H01M 4/02*     (2006.01)

(52) U.S. Cl.
    CPC ..... *H01M 10/0525* (2013.01); *H01M 50/417* (2021.01); *H01M 50/423* (2021.01); *H01M 50/431* (2021.01); *H01M 50/434* (2021.01); *H01M 50/451* (2021.01); *H01M 50/457* (2021.01); *H01M 50/46* (2021.01); *H01M 2004/021* (2013.01); *H01M 2004/027* (2013.01); *H01M 2004/028* (2013.01)

(56) References Cited

U.S. PATENT DOCUMENTS

| | | | |
|---|---|---|---|
| 2014/0370358 A1 | 12/2014 | Hong et al. | |
| 2017/0104246 A1 | 4/2017 | Takeda | |
| 2017/0229743 A1* | 8/2017 | Ito | H01M 10/4235 |

FOREIGN PATENT DOCUMENTS

| | | | | |
|---|---|---|---|---|
| JP | 2013-114764 A | | 6/2013 | |
| JP | 2014-180822 A | | 9/2014 | |
| JP | 2015-505137 A | | 2/2015 | |
| JP | 2016-72120 A | | 5/2016 | |
| JP | 2016072120 A | * | 5/2016 | |
| JP | 2017-63041 A | | 3/2017 | |

OTHER PUBLICATIONS

International Search Report dated Jan. 29, 2019, issued in counterpart application No. PCT/JP2018/040794 (2 pages).
English Translation of CN Search Report dated Jun. 23, 2022, issued in counterpart CN application No. 201880053885.8. (2 pages).

* cited by examiner

NON-AQUEOUS ELECTROLYTE SECONDARY BATTERY HAVING SEPARATOR WITH MULTILAYER STRUCTURE

TECHNICAL FIELD

The present disclosure relates to a technique pertaining to non-aqueous electrolyte secondary batteries.

BACKGROUND ART

In recent years, a non-aqueous electrolyte secondary battery that includes a positive electrode, a negative electrode, and a non-aqueous electrolyte and that is charged or discharged through transfer of lithium ions or the like between the positive electrode and the negative electrode has been widely used as a high-power and high-energy density secondary battery.

For example, PTL 1 proposes, for the purpose of achieving high capacity and high power, a non-aqueous electrolyte secondary battery including a positive electrode, a negative electrode, and a separator disposed between the positive electrode and the negative electrode, wherein the separator includes a porous sheet and a filler layer containing inorganic particles and disposed on the porous sheet.

CITATION LIST

Patent Literature

PTL 1: Japanese Published Unexamined Patent Application No. 2017-63041

SUMMARY OF INVENTION

However, if a non-aqueous electrolyte secondary battery is exposed to abnormal conditions, such as overcharging, internal short circuit, external short circuit, excessive resistance heating due to large current, or external heating or the like, the battery temperature rises, and the battery may generate heat to further increase the battery temperature.

An object of the present disclosure is to provide a non-aqueous electrolyte secondary battery that is unlikely to generate heat upon exposure of the battery to abnormal conditions.

A non-aqueous electrolyte secondary battery according to an aspect of the present disclosure includes a positive electrode, a negative electrode, and a separator disposed between the positive electrode and the negative electrode. The separator has a multilayer structure including a porous resin substrate, a first filler layer containing phosphate particles, and a second filler layer containing inorganic particles having higher heat resistance than the phosphate particles. The second filler layer is disposed on the porous resin substrate. The first filler layer is disposed on the porous resin substrate or the second filler layer in such a manner that the surface of the first filler layer faces the surface of the negative electrode. The phosphate particles have a BET specific surface area in the range of 5 $m^2$/g or more and 100 $m^2$/g or less.

According to an aspect of the present disclosure, it is possible to suppress heat generation of a battery upon exposure of the battery to abnormal conditions.

DESCRIPTION OF EMBODIMENTS

Figure 1:
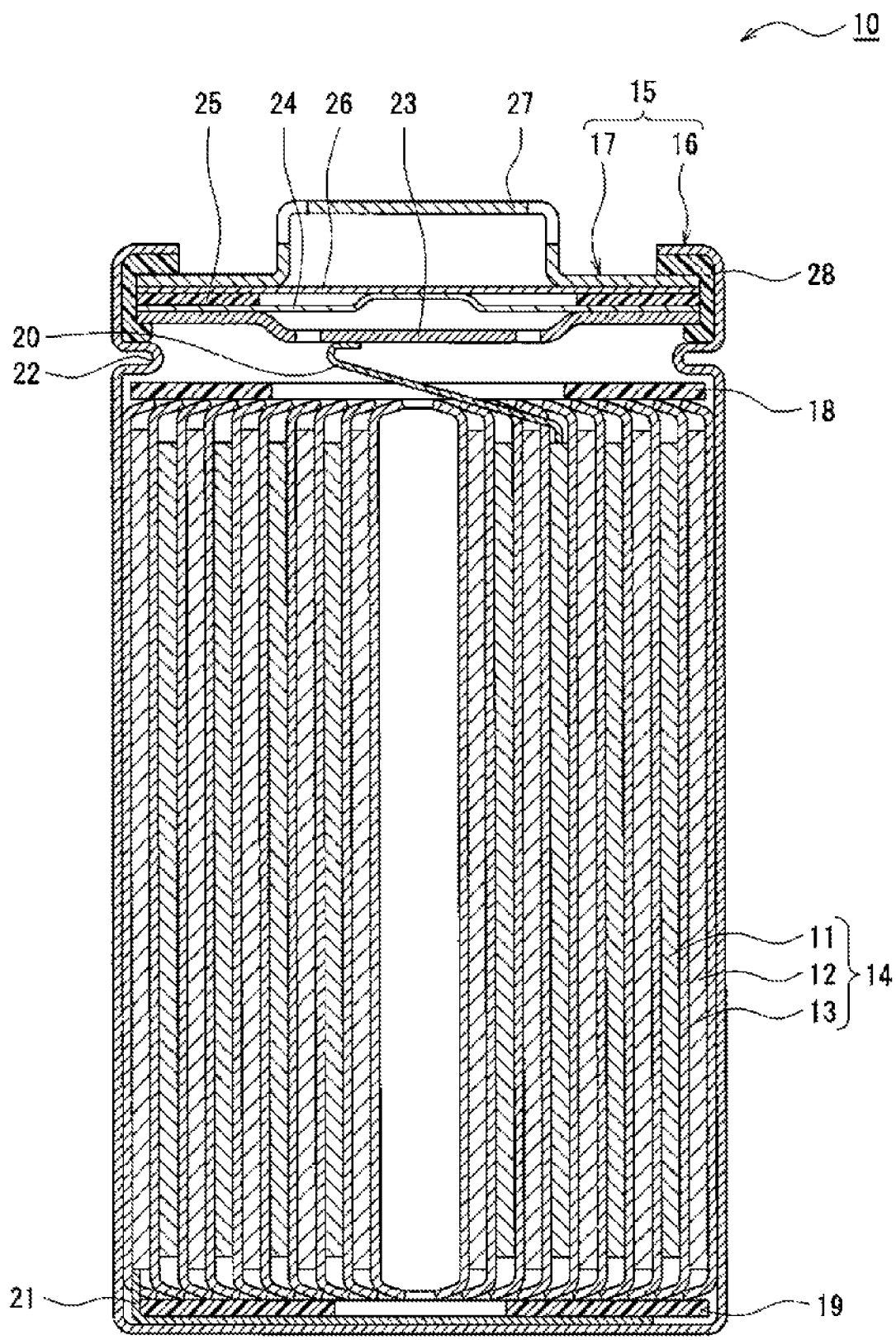
FIG. 1 is a cross-sectional view of a non-aqueous electrolyte secondary battery according to an exemplary embodiment.

As described above, the exposure of a battery to abnormal conditions may increase battery temperature and cause the battery to generate heat. The heat generation of the battery may be attributed to the heat generated by the decomposition reaction of a SEI coating film formed on the negative electrode surface, the heat generated by the decomposition reaction of a non-aqueous electrolyte on the negative electrode, the heat generated by the reaction between the negative electrode and oxygen released from the positive electrode, and the like. Thus, the heat generation of the battery upon exposure of the battery to abnormal conditions is reduced by suppressing at least one of these reactions on the negative electrode, which can suppress a further increase in battery temperature. The inventors of the present invention have conducted intensive studies and, as a result, have found a separator that can suppress, for example, the reactions on a negative electrode caused when a battery is exposed to abnormal conditions, thereby completing a non-aqueous electrolyte secondary battery according to the aspect described below.

A non-aqueous electrolyte secondary battery according to an aspect of the present disclosure includes a positive electrode, a negative electrode, and a separator disposed between the positive electrode and the negative electrode. The separator has a multilayer structure including a porous resin substrate, a first filler layer containing phosphate particles, and a second filler layer containing inorganic particles having higher heat resistance than the phosphate particles. The second filler layer is disposed on the porous resin substrate. The first filler layer is disposed on the porous resin substrate or the second filler layer in such a manner that the surface of the first filler layer faces the surface of the negative electrode. The phosphate particles have a BET specific surface area in the range of 5 $m^2$/g or more and 100 $m^2$/g or less. According to the non-aqueous electrolyte secondary battery according to the aspect of the present disclosure, it is possible to suppress heat generation of the battery upon exposure of the battery to abnormal conditions. The mechanism for obtaining the above advantageous effect is not fully understood but may be considered as described below.

If the battery is exposed to abnormal conditions and the battery temperature rises to a temperature higher than or equal to a predetermined temperature, the exothermic reaction due to the decomposition of the SEI coating film formed on the negative electrode surface causes the phosphate particles having the above predetermined BET specific surface area and contained in the first filler layer to melt and flow into the pores of the porous resin substrate. At the same time, on the negative electrode, the melted phosphate undergoes polycondensation to form a coating film of a phosphate polycondensation product. Here, the increase in battery temperature causes deformation and shrinkage of the porous resin substrate, which results in heat generation due to Joule heating caused by the contact between the positive and negative electrodes. However, according to one aspect of the present disclosure, the porous resin substrate is reinforced by the second filler layer containing inorganic particles having higher heat resistance than phosphate particles, and the porous resin substrate is thus less likely to deform or shrink. It is therefore possible to sufficiently form a coating film of a phosphate polycondensation product on the negative electrode without causing the contact between the positive and negative electrodes. Accordingly, the coating film of the phosphate polycondensation product formed on the negative electrode may suppress, for example, the decomposition reaction of the non-aqueous electrolyte on the negative electrode and the reaction between the negative electrode and oxygen released from the positive electrode.

Hereinafter, exemplary embodiments will be described in detail. The drawings to which reference is made in the description of the embodiments are schematically illustrated. The dimensional ratios and the like of components in the drawings may be different from actual dimensional ratios and the like.

FIG. 1 is a cross-sectional view of a non-aqueous electrolyte secondary battery according to an exemplary embodiment. A non-aqueous electrolyte secondary battery 10 illustrated in FIG. 1 includes a wound-type electrode body 14 in which a positive electrode 11 and a negative electrode 12 are wound with a separator 13 interposed therebetween, a non-aqueous electrolyte, and insulating plates 18 and 19 respectively disposed on the upper and lower sides of the electrode body 14, and a battery case 15 accommodating the above members. The battery case 15 includes a case body 16 having a bottomed cylindrical shape and a sealing body 17 which seals an opening of the case body 16. Alternatively, other types of electrode bodies, such as a stacked-type electrode body formed by alternately stacking a positive electrode and a negative electrode with a separator interposed therebetween, may be employed instead of the wound-type electrode body 14. Examples of the battery case 15 include a metal case having, for example, a cylindrical shape, a prismatic shape, a coin shape, or a button shape, and a resin case formed by laminating resin sheets (laminate-type battery).

The case body 16 is, for example, a metal container having a bottomed cylindrical shape. A gasket 28 is disposed between the case body 16 and the sealing body 17 to ensure sealing of the battery. The case body 16 has, for example, a protrusion 22 which supports the sealing body 17 and which is formed such that the side surface partially protrudes toward the inside. The protrusion 22 is preferably annularly formed in the circumferential direction of the case body 16 and supports the sealing body 17 on its upper surface.

The sealing body 17 has a structure in which a filter 23, a lower valve body 24, an insulating member 25, an upper valve body 26, and a cap 27 are stacked in this order from the electrode body 14 side. The members that constitute the sealing body 17 have, for example, a disc shape or ring shape. The members other than the insulating member 25 are electrically connected to one another. The lower valve body 24 and the upper valve body 26 are connected to each other at their center portions, and the insulating member 25 is interposed between the peripheral portions of the lower valve body 24 and the upper valve body 26. When heat generation caused by an internal short circuit or the like increases the internal pressure, for example, the lower valve body 24 deforms so as to press the upper valve body 26 toward the cap 27 and fractures. This breaks the electrical connection between the lower valve body 24 and the upper valve body 26. If the internal pressure further increases, the upper valve body 26 fractures, and gas is released through an opening of the cap 27.

In the non-aqueous electrolyte secondary battery 10 illustrated in FIG. 1, a positive electrode lead 20 attached to the positive electrode 11 passes through a through-hole of the insulating plate 18 and extends toward the sealing body 17, whereas a negative electrode lead 21 attached to the negative electrode 12 passes outside the insulating plate 19 and extends toward the bottom of the case body 16. The positive electrode lead 20 is connected to the lower surface of the filter 23, which is a bottom plate of the sealing body 17, by welding or the like. A cap 27 is a top plate of the sealing body 17 electrically connected to the filter 23 and serves as a positive electrode terminal. The negative electrode lead 21 is connected to the bottom inner surface of the case body 16 by welding or the like. The case body 16 serves as a negative electrode terminal.

The positive electrode, the negative electrode, the separator, and the non-aqueous electrolyte will be described in detail.

[Separator]

Figure 2:
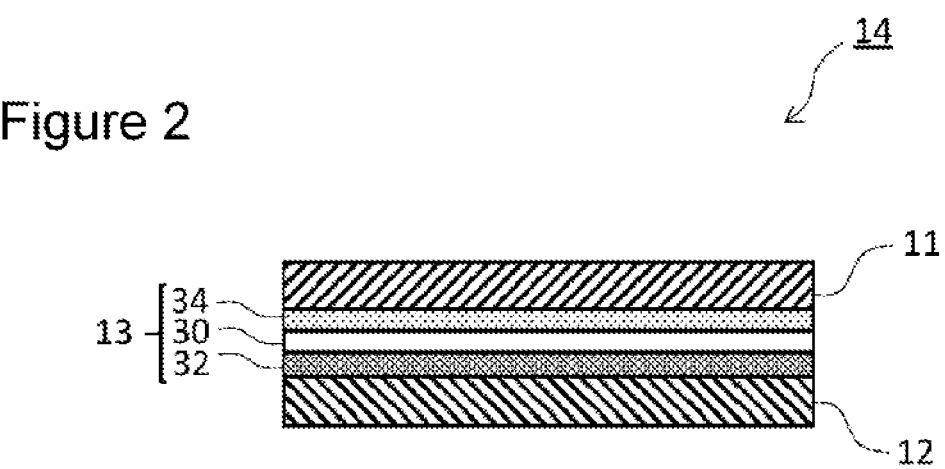
FIG. 2 is a partially enlarged cross-sectional view of one example of the electrode body illustrated in FIG. 1.

FIG. 2 is a partially enlarged cross-sectional view of an example of the electrode body illustrated in FIG. 1. In the electrode body 14 illustrated in FIG. 2, the separator 13 disposed between the positive electrode 11 and the negative electrode 12 has a multilayer structure including a porous resin substrate 30, a first filler layer 32 containing phosphate particles, and a second filler layer 34 containing inorganic particles having higher heat resistance than the phosphate particles. The second filler layer 34 is disposed on the porous resin substrate 30. The first filler layer 32 is disposed on the porous resin substrate 30 (the surface away from the second filler layer 34) in such a manner that the surface of the first filler layer 32 faces the surface of the negative electrode 12. In other words, the separator 13 illustrated in FIG. 2 has a multilayer structure in which the first filler layer 32, the porous resin substrate 30, and the second filler layer 34 are stacked in this order from the negative electrode 12 side. The first filler layer 32 is in contact with the negative electrode 12. The first filler layer 32 is not necessarily in contact with the negative electrode 12.

In the separator 13 illustrated in FIG. 2, the second filler layer 34 is disposed between the porous resin substrate 30 and the positive electrode 11, and the second filler layer 34 is in contact with the positive electrode 11. The second filler layer 34 is not necessarily in contact with the positive electrode 11. As an example, a layer containing resin as a main component (preferably a layer consisting of resin) may be disposed between the second filler layer 34 and the positive electrode 11. In the separator 13 illustrated in FIG. 2, the porous resin substrate 30 is in contact with the first filler layer 32, but the porous resin substrate 30 is not necessarily in contact with the first filler layer 32. As an example, a layer containing resin as a main component (preferably a layer consisting of resin) may be disposed between the porous resin substrate 30 and the first filler layer 32.

In the separator 13 illustrated in FIG. 2, the porous resin substrate 30 is reinforced by the second filler layer 34 containing inorganic particles having higher heat resistance than phosphate particles, and the porous resin substrate 30 is thus less likely to thermally deform or shrink.

The porous resin substrate 30 is, for example, an insulating porous resin sheet having ion permeability. Examples of the porous resin sheet include a microporous thin film, a woven fabric, and a non-woven fabric. Examples of the resin that forms the porous resin substrate 30 include polyolefins, such as polyethylene, polypropylene, a copolymer of polyethylene and an α-olefin; and acrylic resin, polystyrene, polyester, and cellulose. The porous resin substrate 30 may have a monolayer structure or a multilayer structure.

The thickness of the porous resin substrate 30 is preferably, but not necessarily, for example, in the range of 3 μm or more and 20 μm or less.

To ensure ionic conductivity during charging and discharging of the battery, the porosity of the porous resin substrate 30 is preferably, for example, in the range of 30% or more and 70% or less. The porosity of the porous resin substrate 30 is determined by punching the porous resin substrate 30 at 10 positions into a circular shape with a diameter of 2 cm in the thickness direction of the porous resin substrate 30, and measuring the center thickness h and the mass w of the punched-out section of the porous resin substrate 30. Furthermore, the total volume V and the total mass W of 10 punched-out sections of the porous resin substrate 30 are obtained by using the thickness h and the mass w, and the porosity ε is calculated in accordance with the following formula.

Porosity ε (%)=(($\rho V-W$)/($\rho V$))×100

ρ: density of material of porous sheet

To ensure, for example, insulation between the positive and negative electrodes and ionic conductivity during charging and discharging of the battery, the average pore size of the porous resin substrate 30 is preferably, for example, in the range of from 0.02 μm to 5 μm, and more preferably in the range of from 0.05 μm to 1 μm. The average pore size of the porous resin substrate 30 is a value determined by a bubble point method and can be determined by using, for example, a porometer available from Seika Corporation.

The phosphate particles contained in the first filler layer 32 are any phosphate particles having a BET specific surface area in the range of 5 $m^2/g$ or more and 100 $m^2/g$ or less. Examples of the phosphate particles include particles made of $Li_3PO_4$, LiPON, $Li_2HPO_4$, $LiH_2PO_4$, $Na_3PO_4$, $Na_2HPO_4$, $NaH_2PO_4$, $Zr_3(PO_4)_4$, $Zr(HPO_4)_2$, $HZr_2(PO_4)_3$, $K_3PO_4$, $K_2HPO_4$, $KH_2PO_4$, $Ca_3(PO_4)_2$, $CaHPO_4$, $Mg_3(PO_4)_2$, and $MgHPO_4$. Among these, at least one selected from lithium phosphate ($Li_3PO_4$), dilithium hydrogen phosphate ($Li_2HPO_4$), and lithium dihydrogen phosphate ($LiH_2PO_4$) is preferred in order to prevent side reactions.

The BET specific surface area of the phosphate particles contained in the first filler layer 32 is in the range of 5 $m^2/g$ or more and 100 $m^2/g$ or less, and preferably in the range of 20 $m^2/g$ or more and 100 $m^2/g$ or less. In general, the phosphate particles preferably melt at 140° C. to 190° C. in consideration of, for example, the temperature during battery manufacture, the battery internal temperature during ordinary use, and the battery internal temperature upon exposure to abnormal conditions. The phosphate particles having a BET specific surface area in the above range can melt at 140° C. to 190° C., and the heat generation of the battery upon exposure of the battery to abnormal conditions can be effectively suppressed. In the case of phosphate particles having a BET specific surface area of less than 5 $m^2/g$, the amount of the phosphate that melts at 140° C. to 190° C. is smaller than that in the case of phosphate particles satisfying the above range, and it is thus impossible to sufficiently suppress heat generation of the battery upon exposure of the battery to abnormal conditions. In the case of phosphate particles having a BET specific surface area of more than 100 $m^2/g$, the packing density of the first filler layer 32 is smaller than that in the case of phosphate particles satisfying the above range, and the amount of coating with the phosphate polycondensation product is reduced accordingly. It is thus impossible to sufficiently suppress heat generation of the battery upon exposure of the battery to abnormal conditions. The BET specific surface area of the phosphate particles can be determined in accordance with the BET method (nitrogen adsorption method) described in JIS R 1626.

The average particle size of the phosphate particles contained in the first filler layer 32 is preferably, for example, smaller than the average pore size of the porous resin substrate 30 and preferably in the range of from 0.05 μm to 1 μm. When the average particle size of the phosphate particles satisfies the above conditions, the melted phosphate can permeate the porous resin substrate 30 to fill the pores, which can improve the shutdown function of the porous resin substrate 30 and further suppress an increase in battery temperature. The average particle size refers to a volume-average particle size determined by laser diffraction analysis and means a median diameter at 50% of the cumulative volume in the particle-size distribution. The average particle size can be determined by using, for example, a laser diffraction/scattering particle size distribution analyzer (available from Horiba Ltd.).

The amount of the phosphate particles in the first filler layer 32 is preferably sufficient to form a coating film of a phosphate polycondensation product on the negative electrode 12 and is preferably, for example, 90 mass % or more, and more preferably in the range of 92 mass % or more and 98 mass % or less.

The thickness of the first filler layer 32 is preferably, but not necessarily, for example, in the range of 1 μm or more and 10 μm or less, more preferably in the range of 1 μm or more and 5 μm or less, and still more preferably in the range of 2 μm or more and 4 μm or less. To suppress heat generation of the battery, the thickness of the first filler layer 32 is preferably 2 or more and 40 or less times the average particle size of the phosphate particles, and more preferably 3 or more and 20 or less times the average particle size of the phosphate particles.

To ensure, for example, high physical strength and good ionic conductivity during charging and discharging of the battery, the porosity of the first filler layer 32 is preferably, for example, 30% or more and 70% or less. Porosity (%) of first filler layer=100−[[W/(d×ρ)]×100], W: basis weight (g/$cm^2$) of first filler layer, d: thickness (cm) of first filler layer, ρ: average density (g/$cm^3$) of first filler layer The first filler layer 32 preferably contains a binder in order to, for example, improve the mechanical strength of the layer and the adhesion between the first filler layer 32 and other layers. Examples of the binder include polyolefins, such as polyethylene and polypropylene; fluorine-containing resins, such as polyvinylidene fluoride (PVDF), polytetrafluoroethylene (PTFE), polyvinyl fluoride (PVF); fluorine-containing rubbers, such as vinylidene fluoride-hexafluoropropylene-tetrafluoroethylene copolymer and ethylene-tetrafluoroethylene copolymer; rubbers, such as styrene-butadiene copolymer and a hydride thereof, acrylonitrile-butadiene copolymer and a hydride thereof, acrylonitrile-butadiene-styrene copolymer and a hydride thereof, methacrylic acid ester-acrylic acid ester copolymer, styrene-acrylic acid ester copolymer, acrylonitrile-acrylic acid ester copolymer, ethylene propylene rubber, polyvinyl alcohol, and polyvinyl acetate; resins, such as polyphenylene ether, polysulfone, polyether sulfone, polyphenylene sulfide, polyetherimide, polyamideimide, polyamide, polyester, polyacrylonitrile, cellulose, ethylene-vinyl acetate copolymer, polyvinyl chloride, isoprene rubber, butadiene rubber, polymethyl acrylate, polyethyl acrylate, and polyvinyl alcohol; and water-soluble polymers, such as carboxymethyl cellulose (CMC), acrylamide, polyvinyl alcohol, methyl cellulose, guar gum, sodium alginate, carrageenan, xanthan gum, and salts thereof. These may be used alone or in combination of two or more. These binders may be used alone or in combination of two or more.

The first filler layer 32 preferably contains heteropoly acid. Heteropoly acid accelerates the polycondensation of the phosphate melted by elevated battery temperature and thus causes a coating film of a phosphate polycondensation product to efficiently form on the negative electrode 12, which further suppresses battery heat generation.

Examples of heteropoly acids include phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolibdic acid, silicomolybdotungstic acid, and silicomolybdotungstovanadic acid. Among these, at least one or more of silicotungstic acid, phosphomolybdic acid, and phosphotungstic acid are preferred in view of, for example, stability of polymerization and stability of heteropoly acid itself.

The inorganic particles contained in the second filler layer 34 are any inorganic particles having higher heat resistance than the phosphate particles contained in the first filler layer 32 (i.e., inorganic particles having a higher melting point than phosphate particles). The inorganic particles are preferably, for example, inorganic particles having high electrical insulation in order to suppress occurrence of a short circuit between the positive and negative electrodes. Examples of inorganic particles include particles made of metal oxides, metal oxide hydrates, metal hydroxides, metal nitrides, metal carbides, metal sulfides, and the like. Examples of metal oxides or metal oxide hydrates include aluminum oxide (alumina, $Al_2O_3$), boehmite ($Al_2O_3H_2O$ or AlOOH), magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$), and zinc oxide (ZnO). Examples of metal nitrides include silicon nitride ($Si_3N_4$), aluminum nitride (AlN), boron nitride (BN), and titanium nitride (TiN). Examples of metal carbides include silicon carbide (SiC) or boron carbide ($B_4C$). Examples of metal sulfides include barium sulfate ($BaSO_4$). Examples of metal hydroxides include aluminum hydroxide ($Al(OH)_3$). In addition, a porous aluminosilicate, such as zeolite ($M_{2/n}O \cdot Al_2O_3 \cdot xSiO_2 \cdot yH_2O$, M is a metal element, $x \geq 2$, $y \geq 0$), a layered silicate, such as talc ($Mg_3Si_4O_{10}(OH)_2$), or a mineral, such as barium titanate ($BaTiO_3$) or strontium titanate ($SrTiO_3$) may be used. Among these, at least one is preferably selected from alumina, boehmite, talc, titania, silica, and magnesia in view of, for example, electrical insulation and high melting point. In the present invention, the melting point of a substance, such as boehmite which melts after conversion into alumina, refers to the melting point of the substance after conversion.

The average particle size of the inorganic particles contained in the second filler layer 34 is preferably, for example, 0.2 µm or more and 2 µm or less. If the average particle size of the inorganic particles does not satisfy the above range, the effect of suppressing heat generation of the battery upon exposure of the battery to abnormal conditions may deteriorate compared with the case where the average particle size satisfies the above range.

The amount of the inorganic particles in the second filler layer 34 is preferably, for example, 90 mass % or more, and more preferably in the range of 92 mass % or more and 98 mass % or less in order to, for example, ensure the heat resistance of the second filler layer 34.

The thickness of the second filler layer 34 is preferably, but not necessarily, for example, in the range of 1 µm or more and 5 µm or less, and more preferably in the range of 2 µm or more and 4 µm or less.

To ensure, for example, high physical strength and good ionic conductivity during charging and discharging of the battery, the porosity of the second filler layer 34 is preferably, for example, 30% or more and 70% or less. The porosity of the second filler layer 34 is determined in accordance with the same calculation formula as that for the porosity of the first filler layer 32 described above.

The second filler layer 34 preferably contains a binder in order to, for example, improve the mechanical strength of the layer and the adhesion between the second filler layer 34 and other layers. Examples of the binder include the same binders as the binders used in the first filler layer 32.

In FIG. 2, the interface between the porous resin substrate 30 and the first filler layer 32 and the interface between the porous resin substrate 30 and the second filler layer 34 may be present in a mixed manner. However, the porous resin substrate 30, the first filler layer 32, and the second filler layer 34 are preferably present independently so as to each have a thickness of 0.5 µm or more, preferably 0.1 µm or more, and more preferably 1 µm or more.

Figure 3:
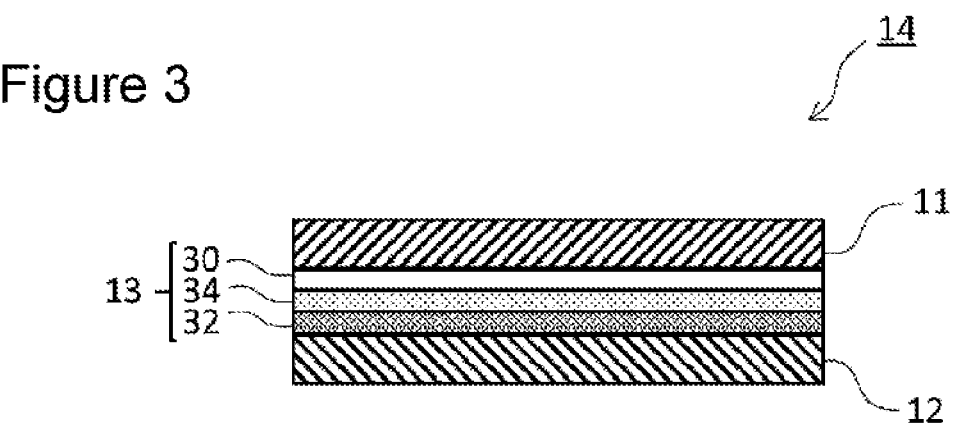
FIG. 3 is a partially enlarged cross-sectional view of another example of the electrode body illustrated in FIG. 1.

FIG. 3 is a partially enlarged cross-sectional view of another example of the wound-type electrode body illustrated in FIG. 1. In an electrode body 14 illustrated in FIG. 3, a separator 13 disposed between a positive electrode 11 and a negative electrode 12 has a multilayer structure including a porous resin substrate 30, a first filler layer 32 containing phosphate particles, and a second filler layer 34 containing inorganic particles having higher heat resistance than the phosphate particles, the second filler layer 34 is disposed on the porous resin substrate 30, and the first filler layer 32 is disposed on the second filler layer 34 in such a manner that the surface of the first filler layer 32 faces the surface of the negative electrode 12. In other words, the separator 13 illustrated in FIG. 3 has a multilayer structure in which the first filler layer 32, the second filler layer 34, and the porous resin substrate 30 are stacked in this order from the negative electrode 12 side. The first filler layer 32 is in contact with the negative electrode 12. The first filler layer 32 is not necessarily in contact with the negative electrode 12. In the separator 13 illustrated in FIG. 3, the porous resin substrate 30 is in contact with the positive electrode 11, but the porous resin substrate 30 is not necessarily in contact with the positive electrode 11. As an example, a layer containing resin as a main component (preferably a layer consisting of resin) may be disposed between the porous resin substrate 30 and the positive electrode 11. In the separator 13 illustrated in FIG. 3, the second filler layer 34 is in contact with the first filler layer 32, but the second filler layer 34 is not necessarily in contact with the first filler layer 32. As an example, a layer containing resin as a main component (preferably a layer consisting of resin) may be disposed between the second filler layer 34 and the first filler layer 32.

In the separator 13 illustrated in FIG. 3 as in the separator 13 illustrated in FIG. 2, the porous resin substrate 30 is reinforced by the second filler layer 34 containing inorganic particles having higher heat resistance than phosphate particles, and the porous resin substrate 30 is thus less likely to thermally deform or shrink.

The features of the porous resin substrate 30 and the second filler layer 34 illustrated in FIG. 3 are the same as those of the porous resin substrate 30 and the second filler layer 34 illustrated in FIG. 2, and the description thereof is omitted.

In the first filler layer 32 illustrated in FIG. 3, the average particle size of the phosphate particles contained in the first filler layer 32 is, for example, preferably smaller than the average pore size of the inorganic particles in the second filler layer 34 and preferably in the range of from 0.05 μm to 1 μm. When the average particle size of the phosphate particles satisfies the above conditions, the melted phosphate can permeate the second filler layer 34 to fill the pores, which causes the second filler layer 34 to exhibit a shutdown function and can further suppress an increase in battery temperature. Other features of the first filler layer 32 illustrated in FIG. 3 are the same as those of the first filler layer 32 illustrated in FIG. 2.

In FIG. 3, the interface between the second filler layer 34 and the first filler layer 32 and the interface between the porous resin substrate 30 and the second filler layer 34 may be present in a mixed manner. However, the porous resin substrate 30, the first filler layer 32, and the second filler layer 34 are preferably present independently so as to each have a thickness of 0.5 μm or more, preferably 0.1 μm or more, and more preferably 1 μm or more.

An example method for manufacturing the separator 13 will be described. First, a first slurry containing phosphate particles and the like and a second slurry containing inorganic particles and the like are prepared. The second slurry is then applied to the porous resin substrate 30 and dried to form a second filler layer 34. The first slurry is applied to the second filler layer 34 or a surface of the porous resin substrate 30 away from the second filler layer and dried to form a first filler layer 32, whereby the separator 13 is produced. The first slurry containing phosphate particles and the like may be applied to the negative electrode 12.

[Positive Electrode]

The positive electrode 11 includes, for example, a positive electrode current collector formed of metal foil or the like, and a positive electrode mixture layer formed on the positive electrode current collector. The positive electrode current collector is, for example, a foil made of a metal, such as aluminum, stable in the potential range of the positive electrode or a film having a surface layer made of the metal.

The positive electrode mixture layer contains a positive electrode active material. The positive electrode mixture layer preferably contains a conductive material and a binder in addition to the positive electrode active material. The thickness of the positive electrode mixture layer is, for example, 10 μm or more.

The positive electrode 11 can be produced by, for example, preparing a positive electrode mixture slurry containing a positive electrode active material, a conductive material, and a binder, applying the positive electrode mixture slurry to the positive electrode current collector, drying the positive electrode mixture slurry to form a positive electrode mixture layer, and pressing the positive electrode mixture layer.

Examples of the positive electrode active material include a lithium transition metal oxide containing a transition metal element, such as Co, Mn, or Ni. To increase the capacity of the non-aqueous electrolyte secondary battery, the lithium transition metal oxide is preferably, for example, a Ni-containing lithium transition metal oxide that contains nickel (Ni) and in which the proportion of Ni relative to the total number of moles of metal elements other than lithium (Li) is 30 mol % or more. Examples of the Ni-containing lithium transition metal oxide include an oxide represented by composition formula $Li_aNi_xM_{(1-x)}O_2$ ($0.95 \leq a \leq 1.2$, $0.3 \leq x < 1.0$, M is a metal element other than Li and Ni). In the formula, M may include at least one selected from cobalt (Co), manganese (Mn), tungsten (W), niobium (Nb), molybdenum (Mo), phosphorus (P), and sulfur (S). In addition, M may include at least one selected from magnesium (Mg), aluminum (Al), calcium (Ca), scandium (Sc), titanium (Ti), vanadium (V), chromium (Cr), iron (Fe), copper (Cu), zinc (Zn), gallium (Ga), germanium (Ge), yttrium (Y), zirconium (Zr), tin (Sn), antimony (Sb), lead (Pb), and bismuth (Bi). Among these, Co, Mn, or the like is preferred.

Examples of the conductive material include carbon materials, such as carbon black, acetylene black, Ketjenblack, and graphite. These may be used alone or in combination of two or more.

Examples of the binder include fluorocarbon resins, such as polytetrafluoroethylene (PTFE), polyvinylidene fluoride (PVdF); and polyacrylonitrile (PAN), polyimides, acrylic resins, and polyolefins. These resins may be used together with carboxymethyl cellulose (CMC) or a salt thereof, polyethylene oxide (PEO), or the like. These may be used alone or in combination of two or more.

[Negative Electrode]

The negative electrode 12 includes, for example, a negative electrode current collector formed of metal foil or the like, and a negative electrode mixture layer formed on the current collector. The negative electrode current collector may be, for example, a foil made of a metal, such as copper, stable in the potential range of the negative electrode or a film having a surface layer made of the metal. The negative electrode mixture layer contains a negative electrode active material and a binder. The negative electrode 12 can be produced by, for example, preparing a negative electrode mixture slurry containing a negative electrode active material, a binder, and the like, applying the negative electrode mixture slurry to the negative electrode current collector, drying the negative electrode mixture slurry to form a negative electrode mixture layer, and pressing the negative electrode mixture layer.

The negative electrode active material is any active material that can reversibly intercalate and deintercalate lithium ions. Examples of the negative electrode active material include carbon materials, such as natural graphite and synthetic graphite, metals, such as silicon (Si) and tin (Sn), to be alloyed with lithium, alloys containing a metal element, such as Si or Sn, and composite oxides. The negative electrode active material may be used alone or in combination of two or more.

Examples of the binder include fluorocarbon resins, PAN, polyimides, acrylic resins, and polyolefins, which are the same as those for the positive electrode. When the mixture slurry is prepared by using an aqueous solvent, CMC or a salt thereof, styrene-butadiene rubber (SBR), polyacrylic acid (PAA) or a salt thereof, polyvinyl alcohol (PVA), or the like is preferably used.

[Non-Aqueous Electrolyte]

The non-aqueous electrolyte contains a non-aqueous solvent and an electrolyte salt dissolved in the non-aqueous solvent. The non-aqueous electrolyte is not limited to a liquid electrolyte (non-aqueous electrolyte solution), and may be a solid electrolyte formed by using a gel polymer or the like. Examples of the non-aqueous solvent include esters, ethers, nitriles such as acetonitrile, and amides such as dimethylformamide, and solvent mixtures of two or more of these. The non-aqueous solvent may contain a halogenated product formed by substituting at least some of hydrogen atoms of such a solvent with halogen atoms, such as a fluorine atom.

Examples of the esters include cyclic carbonic acid esters, such as ethylene carbonate (EC), propylene carbonate (PC), and butylene carbonate; chain carbonic acid esters, such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylic acid esters, such as γ-butyrolactone (GBL) and γ-valerolactone (GVL); and chain carboxylic acid esters, such as methyl acetate, ethyl acetate, propyl acetate, methyl propionate (MP), ethyl propionate, and γ-butyrolactone.

Examples of ethers include cyclic ethers, such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ether; and chain ethers, such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the halogenated product include fluorinated cyclic carbonic acid esters, such as fluoroethylene carbonate (FEC); fluorinated chain carbonic acid esters; and fluorinated chain carboxylic acid esters, such as fluoromethyl propionate (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ (1<x<6, n is 1 or 2), $LiB_{10}Cl_{10}$, LiCl, LiBr, LiI, chloroborane lithium, lower-aliphatic lithium carboxylates, borates, such as $Li_2B_4O_7$ and $Li(B(C_2O_4)F_2)$, imide salts, such as $LiN(SO_2CF_3)_2$, $LiN(C_lF_{2l+1}SO_2)(C_mF_{2m+1}SO_2)$ {l and m are integers of 0 or more}. The lithium salt may be used alone or in combination of two or more. Among these, $LiPF_6$ is preferably used in view of ionic conductivity, electrochemical stability, and the like. The concentration of the lithium salt is preferably 0.8 to 1.8 mol per liter of the non-aqueous solvent.

EXAMPLES

The present disclosure will be further described below by way of Examples, but the present disclosure is not limited to these Examples.

Example 1

[Production of Separator]

A separator having a multilayer structure of a first filler layer containing phosphate particles/a porous resin substrate/a second filler layer containing inorganic particles was produced in the following manner.

A first slurry having a solids content of 15.0 mass % was prepared by mixing lithium phosphate particles ($Li_3PO_4$, BET specific surface area: 54.07 m²/g, volume-average particle size D50: 0.93 μm) and poly-N-vinylacetamide serving as a binder at a mass ratio of 100:6.5, and adding N-methyl-2-pyrrolidone (NMP) to the resulting mixture. A second slurry having a solids content of 15.0 mass % was prepared by mixing boehmite particles (average particle size D50: 0.7 μm) serving as inorganic particles and poly-N-vinylacetamide serving as a binder at a mass ratio of 100:6.5, and adding NMP to the resulting mixture. The first slurry was applied to one surface of a 12-μm-thick polypropylene porous sheet (porous resin substrate) by using a wire bar such that the coating amount after drying was 6.4 g/m². The first slurry was then dried to form a first filler layer containing phosphate particles. The second slurry was applied to the other surface of the polypropylene porous sheet by using a wire bar such that the coating amount after drying was 6.0 g/m². The second slurry was then dried to form a second filler layer containing inorganic particles. The thickness of the first filler layer and the second filler layer thus formed was 4 μm.

[Production of Positive Electrode]

A positive electrode mixture slurry was prepared by mixing lithium composite oxide particles represented by $Li_{1.05}Ni_{0.82}Co_{0.15}Al_{0.03}O_2$ and serving as a positive electrode active material, carbon black serving as a conductive material, and polyvinylidene fluoride serving as a binder at a mass ratio of 100:1:1 in an NMP solution. Next, the positive electrode mixture slurry was applied to each surface of the positive electrode current collector formed of aluminum foil. The positive electrode mixture slurry was dried, followed by rolling with a rolling roller. A current collector tab made of aluminum was attached to the positive electrode current collector to produce a positive electrode in which the positive electrode mixture layer was formed on each surface of the positive electrode current collector. The packing density of the positive electrode active material in the positive electrode was 3.60 g/cm³.

[Production of Negative Electrode]

A negative electrode mixture slurry was prepared by mixing synthetic graphite serving as a negative electrode active material, CMC (sodium carboxymethyl cellulose) serving as a dispersant, and SBR (styrene butadiene rubber) serving as a binder at a mass ratio of 92:8:1:1 in an aqueous solution. Next, the negative electrode mixture slurry was applied to each surface of the negative electrode current collector formed of copper foil. The negative electrode mixture slurry was dried, followed by rolling with a rolling roller. A current collector tab made of nickel was attached to the negative electrode current collector. Accordingly, a negative electrode in which the negative electrode mixture layer was formed on each surface of the negative electrode current collector was produced. The packing density of the negative electrode active material in the negative electrode was 1.50 g/cm³.

[Production of Non-Aqueous Electrolyte]

Lithium hexafluorophosphate ($LiPF_6$) was dissolved at a concentration of 1.0 mol/L in a solvent mixture formed by mixing ethylene carbonate (EC), ethyl methyl carbonate (EMC), and dimethyl carbonate (DMC) at a volume ratio of 3:3:4. In addition, 1.0 mass % of vinylene carbonate (VC) was dissolved in the solvent mixture. The resulting solution was used as a non-aqueous electrolyte.

[Production of Non-Aqueous Electrolyte Secondary Battery]

A non-aqueous electrolyte secondary battery was produced by using the positive electrode, the negative electrode, the non-aqueous electrolyte, and the separator in accordance with the following procedure. (1) The negative electrode, the separator, and the positive electrode were stacked in this order such that the first filler layer of the separator faced the negative electrode and the second filler layer of the separator faced the positive electrode, and these were wound to produce an electrode body having a wound structure. (2) An insulating plate was disposed on each of the upper and lower sides of the electrode body so that the wound electrode body was accommodated in a cylindrical battery outer can. (3) A current collector tab on the negative electrode was welded to the inner surface of the bottom of the battery outer can, while a current collector tab on the positive electrode was welded to the bottom plate of the sealing body. (4) A non-aqueous electrolyte was injected through an opening of the battery outer can, and the battery outer can was then sealed with the sealing body.

Example 2

A non-aqueous electrolyte secondary battery was produced in the same manner as in Example 1 except that the lithium phosphate particles used in Example 1 were changed to dilithium hydrogen phosphate particles ($Li_2HPO_4$, BET specific surface area: 7.10 $m^2$/g, volume-average particle size D50: 0.33 μm) in separator production. The thickness of the first filler layer was 3 μm.

Example 3

A non-aqueous electrolyte secondary battery was produced in the same manner as in Example 1 except that the lithium phosphate particles used in Example 1 were changed to lithium phosphate particles ($Li_3PO_4$, BET specific surface area: 61.35 $m^2$/g, volume-average particle size D50: 0.15 μm) in separator production. The thickness of the first filler layer was 10 μm.

Example 4

A separator having a multilayer structure of a porous resin substrate/a second filler layer containing inorganic particles/a first filler layer containing phosphate particles was produced in the following manner.

The second slurry used in Example 1 was applied to one surface of a polypropylene porous sheet (porous resin substrate) and dried to form a second filler layer containing inorganic particles. Next, the first slurry used in Example 1 was applied to the second filler layer and dried to form a first filler layer containing phosphate particles. The thickness of the first filler layer and the second filler layer thus formed was 4 μm.

A non-aqueous electrolyte secondary battery was produced in the same manner as in Example 1 except that the negative electrode, the separator, and the positive electrode were stacked in this order such that the first filler layer of the produced separator faced the negative electrode and the porous resin substrate of the separator faced the positive electrode.

Comparative Example 1

A separator was produced in the same manner as in Example 1 except that the lithium phosphate particles used in Example 1 were changed to lithium phosphate particles ($Li_3PO_4$, BET specific surface area: 3.65 $m^2$/g, volume-average particle size D50: 1.60 μm) in separator production. A non-aqueous electrolyte secondary battery was produced in the same manner as in Example 1 except that this separator was used. The thickness of the first filler layer was 5 μm.

Comparative Example 2

A separator having a multilayer structure of a porous resin substrate/a first filler layer containing phosphate particles/a second filler layer containing inorganic particles was produced in the following manner.

The first slurry used in Example 1 was applied to one surface of a polypropylene porous sheet (porous resin substrate) and dried to form a first filler layer containing phosphate particles. Next, the second slurry used in Example 1 was applied to the first filler layer and dried to form a second filler layer containing inorganic particles. The thickness of the first filler layer and the second filler layer thus formed was 4 μm.

A non-aqueous electrolyte secondary battery was produced in the same manner as in Example 1 except that the negative electrode, the separator, and the positive electrode were stacked in this order such that the porous resin substrate of the produced separator faced the negative electrode and the second filler layer of the separator faced the positive electrode.

Comparative Example 3

A non-aqueous electrolyte secondary battery was produced in the same manner as in Example 1 except that the negative electrode, the separator, and the positive electrode were stacked in this order such that the second filler layer of the separator produced in Comparative Example 2 faced the negative electrode and the porous resin substrate of the separator faced the positive electrode.

Comparative Example 4

A separator having a multilayer structure of a porous resin substrate/a first filler layer containing phosphate particles was produced in the following manner.

The first slurry used in Example 1 was applied to one surface of a polypropylene porous sheet (porous resin substrate) and dried to form a first filler layer containing phosphate particles. The thickness of the first filler layer thus formed was 4 μm.

A non-aqueous electrolyte secondary battery was produced in the same manner as in Example 1 except that the negative electrode, the separator, and the positive electrode were stacked in this order such that the porous resin substrate of the produced separator faced the negative electrode and the first filler layer of the separator faced the positive electrode.

Comparative Example 5

A non-aqueous electrolyte secondary battery was produced in the same manner as in Example 1 except that the negative electrode, the separator, and the positive electrode were stacked in this order such that the first filler layer of the separator produced in Comparative Example 4 faced the negative electrode and the porous resin substrate of the separator faced the positive electrode.

Comparative Example 6

A separator having a multilayer structure of a porous resin substrate/a second filler layer containing inorganic particles was produced in the following manner.

The second slurry used in Example 1 was applied to one surface of a polypropylene porous sheet (porous resin substrate) and dried to form a second filler layer containing inorganic particles. The thickness of the second filler layer thus formed was 4 μm.

A non-aqueous electrolyte secondary battery was produced in the same manner as in Example 1 except that the negative electrode, the separator, and the positive electrode were stacked in this order such that the porous resin substrate of the produced separator faced the negative electrode and the second filler layer of the separator faced the positive electrode.

Comparative Example 7

A non-aqueous electrolyte secondary battery was produced in the same manner as in Example 1 except that the negative electrode, the separator, and the positive electrode were stacked in this order such that the second filler layer of the separator produced in Comparative Example 6 faced the negative electrode and the porous resin substrate of the separator faced the positive electrode.

Comparative Example 8

A separator having a multilayer structure of a porous resin substrate/a filler layer containing phosphate particles and inorganic particles was produced.

A slurry having a solids content of 15.0 mass % was prepared by mixing the lithium phosphate particles used in Example 1 and boehmite particles at a mass ratio of 50:50, mixing this mixture and poly-N-vinylacetamide serving as a binder at a mass ratio of 100:6.5, and adding N-methyl-2-pyrrolidone (NMP) to the resulting mixture. The slurry was applied to one surface of a polypropylene porous sheet (porous resin substrate) by using a wire bar such that the coating amount after drying was 6.4 g/m$^2$. The slurry was then dried to form a filler layer containing phosphate particles and inorganic particles. The thickness of the filler layer thus formed was 4 μm.

A non-aqueous electrolyte secondary battery was produced in the same manner as in Example 1 except that the negative electrode, the separator, and the positive electrode were stacked in this order such that the porous resin substrate of the produced separator faced the negative electrode and the filler layer of the separator faced the positive electrode.

Comparative Example 9

A non-aqueous electrolyte secondary battery was produced in the same manner as in Example 1 except that a polypropylene porous sheet (porous resin substrate) was used as a separator.

[Thermal Test]

The following thermal test was carried out as a simulation test in which batteries were exposed to abnormal conditions. Specifically, a non-aqueous electrolyte secondary battery of each of Examples and Comparative Examples was charged at a constant current of 1.0 It until the battery voltage reached 4.20 V and then charged at a voltage of 4.20 V until the current reached ⅕ It. The battery was then heated in an electric furnace from 25° C. at a temperature rise rate of 0.2° C./min, and the exothermic onset temperature of the battery was measured. The exothermic onset temperature of the battery refers to a temperature at which the temperature rise rate of the battery due to battery heat generation reaches 1° C./min. The higher the exothermic onset temperature of the battery is, the more the heat generation of the battery is suppressed upon exposure of the battery to abnormal conditions.

Table 1 summarizes the results of the exothermic onset temperature in Examples and Comparative Examples.

TABLE 1

| | Separator | | | | | Thermal Test |
|---|---|---|---|---|---|---|
| | First Filler Layer | | | Second Filler Layer Phosphate | | Exothermic |
| | Phosphate | Phosphate BET (m$^2$/g) | Average Particle Size (μm) | Inorganic Particles | Arrangement in Electrode Body | Onset Temperature (° C.) |
| Example 1 | Li$_3$PO$_4$ | 54.07 | 0.93 | boehmite | positive electrode/second filler layer/substrate/first filler layer/negative electrode | 170 |
| Example 2 | Li$_3$PO$_4$ | 7.10 | 0.33 | boehmite | positive electrode/second filler layer/substrate/first filler layer/negative electrode | 171 |
| Example 3 | Li$_3$PO$_4$ | 61.35 | 0.15 | boehmite | positive electrode/second filler layer/substrate/first filler layer/negative electrode | 172 |
| Example 4 | Li$_3$PO$_4$ | 54.07 | 0.93 | boehmite | positive electrode/substrate/second filler layer/first filler layer/negative electrode | 170 |
| Comparative Example 1 | Li$_3$PO$_4$ | 3.65 | 1.60 | boehmite | positive electrode/second filler layer/substrate/first filler layer/negative electrode | 166 |
| Comparative Example 2 | Li$_3$PO$_4$ | 54.07 | 0.93 | boehmite | positive electrode/second filler layer/first filler layer/substrate/negative electrode | 163 |
| Comparative Example 3 | Li$_3$PO$_4$ | 54.07 | 0.93 | boehmite | positive electrode/substrate/first filler layer/second filler layer/negative electrode | 163 |
| Comparative Example 4 | Li$_3$PO$_4$ | 54.07 | 0.93 | — | positive electrode//first filler layer/substrate/negative electrode | 162 |
| Comparative Example 5 | Li$_3$PO$_4$ | 54.07 | 0.93 | — | positive electrode/substrate/first filler layer/negative electrode | 162 |
| Comparative Example 6 | — | — | — | boehmite | positive electrode/second filler layer/substrate/negative electrode | 162 |
| Comparative Example 7 | — | — | — | boehmite | positive electrode/substrate/second filler layer/negative electrode | 161 |
| Comparative Example 8 | Li$_3$PO$_4$ | 54.07 | 0.93 | boehmite | positive electrode/filler layer/substrate/negative electrode | 163 |
| Comparative Example 9 | — | — | — | — | positive electrode/substrate/negative electrode | 160 |

The results show that, in each of Examples 1 to 4 compared with Comparative Examples 1 to 9, the exothermic onset temperature is high, and the heat generation of the battery upon exposure to abnormal conditions is suppressed. In other words, it can be said that battery heat generation upon exposure to abnormal conditions is suppressed in a non-aqueous electrolyte secondary battery in which a separator disposed between a positive electrode and a negative electrode has a multilayer structure including a porous resin substrate, a first filler layer containing phosphate particles, and a second filler layer containing inorganic particles having higher heat resistance than the phosphate particles, wherein the second filler layer is formed on the porous resin substrate, the first filler layer is disposed on the porous resin substrate or the second filler layer in such a manner that the surface of the first filler layer faces the surface of the negative electrode, and the phosphate particles have a BET specific surface area in the range of 5 $m^2/g$ or more and 100 $m^2/g$ or less.

REFERENCE SIGNS LIST

10 Non-aqueous electrolyte secondary battery
11 Positive electrode
12 Negative electrode
13 Separator
14 Electrode body
15 Battery case
16 Case body
17 Sealing body
18, 19 Insulating plate
20 Positive electrode lead
21 Negative electrode lead
22 Protrusion
23 Filter
24 Lower valve body
25 Insulating member
26 Upper valve body
27 Cap
28 Gasket
30 Porous resin substrate
32 First filler layer
34 Second filler layer

The invention claimed is:

1. A non-aqueous electrolyte secondary battery comprising: a positive electrode, a negative electrode, and a separator disposed between the positive electrode and the negative electrode,
wherein the separator has a multilayer structure including a porous resin substrate, a first filler layer containing phosphate particles, and a second filler layer containing inorganic particles having higher heat resistance than the phosphate particles,
the second filler layer is disposed on the porous resin substrate,
the first filler layer is disposed on the porous resin substrate or the second filler layer in such a manner that a surface of the first filler layer faces a surface of the negative electrode, and
the phosphate particles have a BET specific surface area in a range of 5 $m^2/g$ or more to 100 $m^2/g$ or less,
wherein a porosity of the porous resin substrate is in a range of 30% or more to 70% or less,
wherein the phosphate particles have an average particle size that is smaller than an average pore size of the porous resin substrate and that is in a range of from 0.05 μm to 1 μm,
wherein the first filler layer comprises a continuous layer configured to cover an entirety of a surface of the porous resin substrate or the second filler layer on which the first filler layer is disposed,
wherein the phosphate particles are configured to melt and flow into pores of the porous resin substrate and simultaneously to undergo polycondensation to form a coating film of a phosphate polycondensation product on the negative electrode in response to an exothermic reaction on a surface of the negative electrode, and
wherein a porosity of the first filler layer is 30% or more and 70% or less.

2. The non-aqueous electrolyte secondary battery according to claim 1, wherein the first filler layer, the porous resin substrate, and the second filler layer in the separator are stacked in this order from a negative electrode side.

3. The non-aqueous electrolyte secondary battery according to claim 1, wherein the first filler layer, the second filler layer, and the porous resin substrate in the separator are stacked in this order from a negative electrode side.

4. The non-aqueous electrolyte secondary battery according to claim 1, wherein the phosphate particles have a BET specific surface area in a range of 20 $m^2/g$ or more to 100 $m^2/g$ or less.

5. The non-aqueous electrolyte secondary battery according to claim 1, wherein the phosphate particles comprise at least one selected from dilithium hydrogen phosphate, lithium dihydrogen phosphate, and lithium phosphate.

6. The non-aqueous electrolyte secondary battery according to claim 3, wherein the phosphate particles have an average particle size that is smaller than an average particle size of the inorganic particles and that is in a range of from 0.05 μm to 1 μm.

7. A non-aqueous electrolyte secondary battery comprising: a positive electrode, a negative electrode, and a separator disposed between the positive electrode and the negative electrode,
wherein the separator has a multilayer structure including a porous resin substrate, a first filler layer containing phosphate particles, and a second filler layer containing inorganic particles having higher heat resistance than the phosphate particles,
the second filler layer is disposed on the porous resin substrate,
the first filler layer is disposed on the porous resin substrate or the second filler layer in such a manner that a surface of the first filler layer faces a surface of the negative electrode,
the phosphate particles have a BET specific surface area in a range of 5 $m^2/g$ or more to 100 $m^2/g$ or less,
wherein a porosity of the porous resin substrate is in a range of 30% or more to 70% or less,
wherein a thickness of the porous resin substrate is in a range of 3 μm or more to 20 μm or less,
wherein the first filler layer comprises a continuous layer configured to cover an entirety of a surface of the porous resin substrate or the second filler layer on which the first filler layer is disposed,
wherein the phosphate particles are configured to melt and flow into pores of the porous resin substrate and simultaneously to undergo polycondensation to form a coating film of a phosphate polycondensation product on the negative electrode in response to an exothermic reaction on a surface of the negative electrode, and wherein a porosity of the first filler layer is 30% or more and 70% or less.

* * * * *